R. E. HELLMUND.
SYSTEM OF CONTROL.
APPLICATION FILED OCT. 24, 1916.

1,320,053.

Patented Oct. 28, 1919.
6 SHEETS—SHEET 1.

WITNESSES:
Fred. A. Lind.
W. R. Coley

INVENTOR
Rudolf E. Hellmund
BY
Wesley G. Carr
ATTORNEY

R. E. HELLMUND.
SYSTEM OF CONTROL.
APPLICATION FILED OCT. 24, 1916.

1,320,053.

Patented Oct. 28, 1919.
6 SHEETS—SHEET 4.

WITNESSES:
Fred. A. Lind.
W. R. Coley

INVENTOR
Rudolf E. Hellmund
BY Wesley G. Carr
ATTORNEY

R. E. HELLMUND.
SYSTEM OF CONTROL.
APPLICATION FILED OCT. 24, 1916.

1,320,053.

Patented Oct. 28, 1919.
6 SHEETS—SHEET 5.

WITNESSES:
Fred A. Lind.
W. R. Coley

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,320,053.  Specification of Letters Patent.  Patented Oct. 28, 1919.

Application filed October 24, 1916. Serial No. 127,381.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification, this application being a continuation in part of my co-pending application, Serial No. 855,539, filed August 7, 1914.

My invention relates to systems of control for dynamo-electric machines, and it has special relation to the regenerative control of electric motors that are adapted for use in propelling electric railway vehicles, and the like.

One object of my invention is to provide simple, durable, and reliable means for effecting regenerative operation of the momentum-driven armatures of motors of the above-indicated character, whereby a certain proportion of the energy absorbed during the propelling period is returned to the supply circuit, to reduce operating expenses, and whereby various other well-known operating advantages are secured.

Another object of my invention is to provide a system of regenerative control which shall embody means for automatically compensating for the unavoidable voltage fluctuations in the supply-circuit voltage, whereby a substantially constant regenerated current is maintained during such fluctuations.

More specifically stated, an object of my invention is to provide a motor-generator set or dynamotor of relatively small capacity for variably energizing the main series field magnet winding of the propelling motor or motors during regenerative operation. The set may be driven either from the regenerative circuit or from a suitable external source of energy.

Viewed from another angle, it is an object of my invention to provide a regenerative system employing substantially constant main-field winding excitation that is substantially independent of the supply circuit voltage, but is dependent upon the regenerated current for purposes to be set forth.

The various novel circuit arrangements and connections employed in my invention may best be understood by reference to the accompanying drawings, in which Figures 1 to 4, inclusive, are diagrammatic views of the main circuit connections of various control systems embodying my invention; Fig. 5 is a chart, of well-known form, indicating the sequence of operation of the various motor-controlling switches shown in Fig. 4.

Like reference characters designate like parts in all of the figures.

Figure 1:
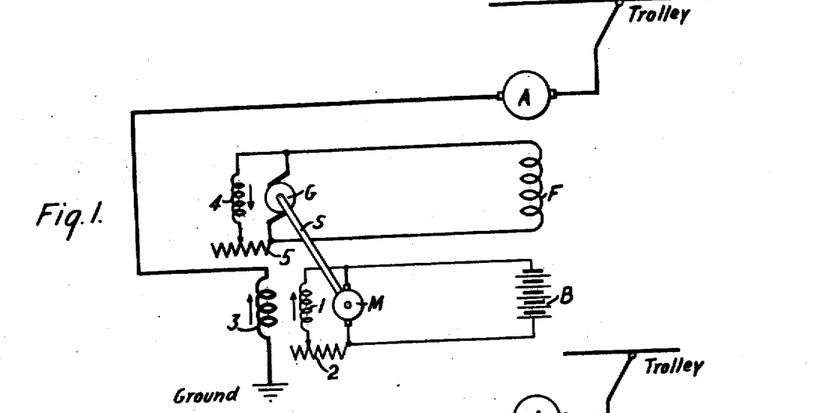

Referring to Fig. 1 of the drawings, the system here shown comprises a supply circuit that includes a supply conductor marked "Trolley" and a return circuit conductor marked "Ground"; a dynamo-electric machine, such as a direct-current railway motor, for example, having an armature A and a series-type field winding F that is preferably connected in series relation with the armature during acceleration, in accordance with a familiar practice; and an auxiliary motor-generator set comprising a motor M that is supplied with propelling energy from a suitable source, such as a battery B, and a generator or exciter G, that is suitably mechanically connected to the motor M, as by a shaft S.

The motor M is provided with a shunt field magnet winding 1, the strength of which may be varied by a suitable resistor 2, and a series-type field winding 3, that is connected in series-circuit relation with the armature A. The generator G has a shunt field winding 4 and a variable resistor 5, and is connected to energize the field winding F of the propelling motor, thereby imparting a compounding characteristic thereto during regeneration. It will be understood that the particular system for accelerating the motor is not material to my present invention, and that any suitable system may be employed.

Assuming the system to be connected as shown and that the armature A is driven by the momentum of the associated vehicle at a speed suitable for regeneration to the supply circuit, the operation of the system, relative to compensation for supply-circuit voltage fluctuations, may be described as follows: If the supply-circuit voltage decreases, the regenerated current will correspondingly increase because of the relatively great difference between the momentary machine voltage and the voltage of the supply circuit. The field flux of the shunt motor M will, consequently, be strengthened through the increased energization of the series field winding 3, thereby decreasing the speed of the motor-generator set, in accordance with well-known principles. The output of the generator G, that is to say, the excitation of the main machine field winding F, is correspondingly decreased, thereby tending to maintain a substantially constant value of regenerated current.

Figures 2, 3:
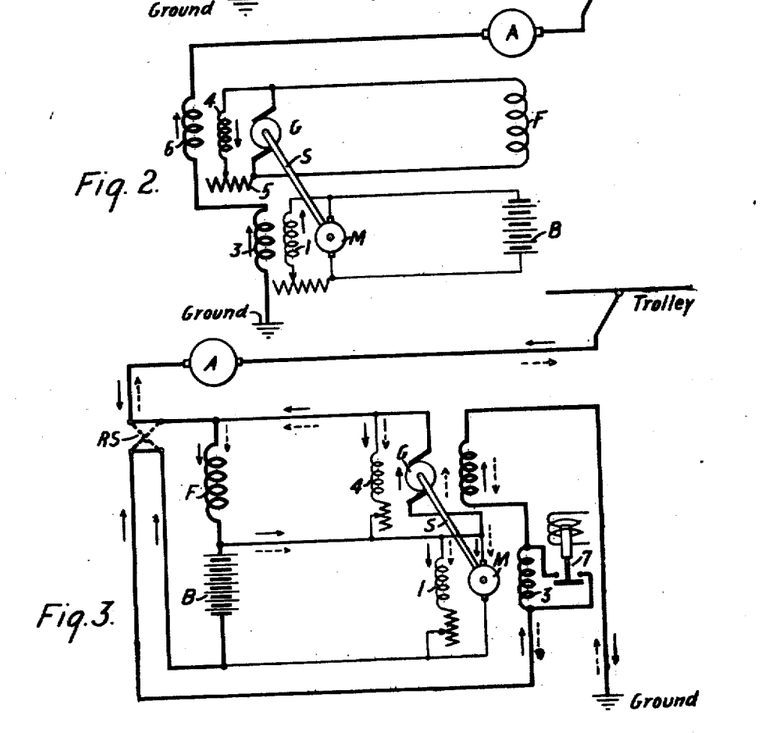

The system shown in Fig. 2 embodies all of the elements of Fig. 1, and, in addition, the generator G is provided with a field magnet winding 6 that is connected in series with the armature A and the series field winding 3, and is suitably differentially-wound with respect to the shunt field winding 4, of the generator G, thus acting in opposition to the field winding 4. In this case, the temporary increase of regenerated current, upon a decrease in supply-circuit voltage, in addition to the slowing-down effect on the motor-generator set, as described in connection with Fig. 1, also serves to decrease the effective field flux of the generator G by reason of the differential action of the series and shunt field windings thereof. The excitation of the series field winding F is thus again decreased, with the desired effect of maintaining a substantially constant regenerated current. Modifications of the system illustrated, by omitting certain of the field windings of the motor-generator set, may be employed in some instances, dependent upon operating conditions.

It should be noted that, in addition to adaptability for regenerative operation, certain of the modifications of my invention may also be employed for "field control" during acceleration and for preventing "flash-over" conditions in the motors upon the resumption of supply-circuit voltage after a temporary interruption thereof. Fig. 1, for instance, shows a system that is adaptable for all three purposes. The action of the series field winding 3 of the small motor during voltage fluctuations that occur in regeneration has already been described. However, if the main motor is used for propelling purposes, the current in the series field winding is reversed, and, therefore, the action of this field winding is in opposition to the action of the motor shunt field winding 1. As a result, the increase of main motor load weakens the field flux of the small motor M, thereby increasing the speed of the motor-generator set and, consequently, increasing the excitation of the series field winding F. In this case, the main motor will have the regular characteristics of a series type of motor. The tendency to "flashing", in case of short current interruptions, will be greatly reduced or eliminated, for the following reason. The inertia or fly-wheel effect of the motor-generator set will maintain rotation above a certain speed for some time, irrespective of the demagnetizing action of the series field winding 3. Moreover, the self-induction of the generator field winding 4 and of the series field winding F, will tend to prevent rapid dying out of the main motor field flux. There will thus be a certain value of main field flux available when supply-circuit current is resumed, thereby preventing the momentary excessive predominance of armature flux over fluid flux, which condition tends to cause "flash-over". Longer power interruptions may be automatically compensated for by energization of the series field winding F from an external source of energy, for example, as set forth in my co-pending application, Serial No. 863,504, filed September 25, 1914. "Field control" may be accomplished by varying the battery voltage, or by manipulating either of the shunt field resistors 2 and 5, as will be understood.

In Fig. 3, the circuits of the motor M and the generator G are interconnected, instead of being electrically independent as shown in Fig. 2. In addition, a reversing switch RS is conveniently interposed between the armature A and the circuits that include the field winding F and the entire motor-generator set. The series field winding 3 of the motor M may be wholly or partially short-circuited by one or more switches 7 for purposes of control.

The operation of the system of Fig. 3 is as follows: During motor acceleration, the current traverses the system as indicated by the solid arrows, and the reversing switch RS occupies the solid line position. For regenerative operation, the electrical relation of the series-connected field winding F is reversed with respect to the armature A, by throwing the reversing switch RS to the dotted line position.

Figures 4, 5:
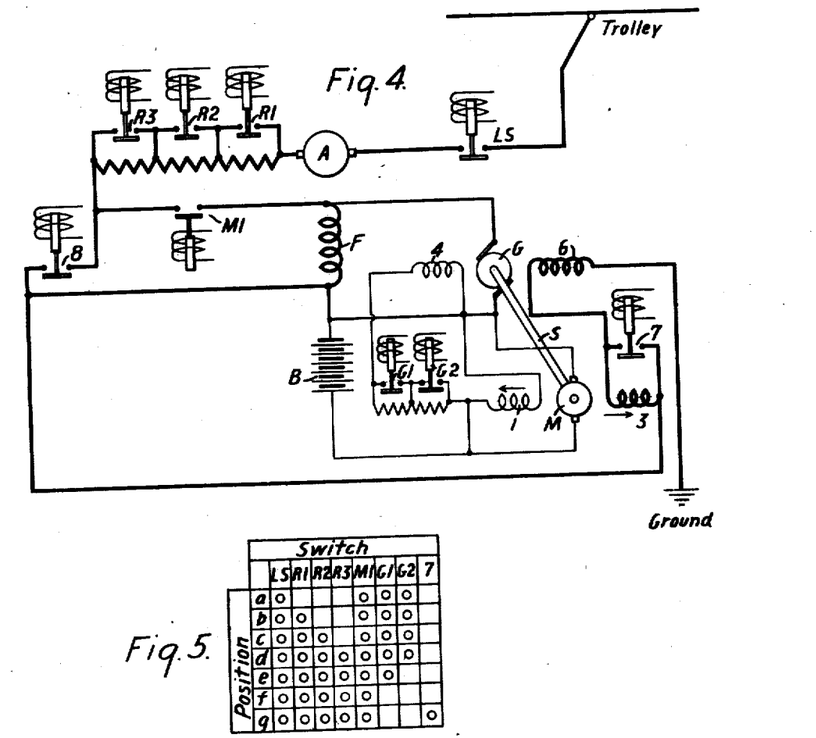

In Fig. 4 is shown a system which obviates the necessity of reversing the battery B, and which permits the use of a battery of relatively small capacity. In the above-described systems, the battery would be discharging at a very heavy rate during regeneration, if its connections were not reversed with respect to the positions occupied during acceleration. The system here shown comprises a supply-circuit conductor marked "Trolley"; a return-circuit conductor marked "Ground"; the main motor armature A; series field magnet winding F; an accelerating resistor, sections of which are adapted to be respectively short-circuited by switches R1, R2 and R3; motor-controlling switches LS, M1 and 8; the motor-generator set comprising motor M, with shunt and series field windings 1 and 3, respectively, generator G, with shunt and series field windings 4 and 6, respectively, and battery B that is connected to the terminals of the motor M; a resistor that is disposed in series relation with the shunt field winding 4 across the battery B, the sections of said resistor being adapted for respective short-circuiting by switches G1 and G2; and a switch 7 for short-circuiting the series field winding 3.

Figure 6:
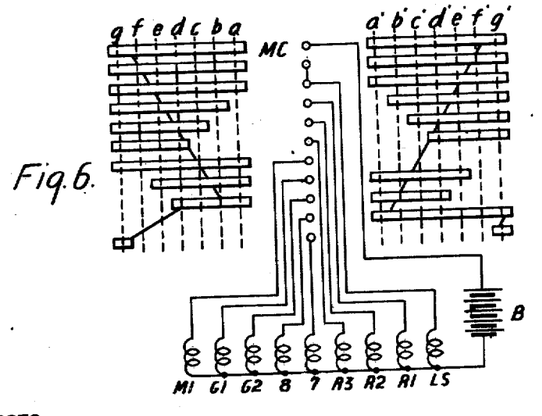
Fig. 6 is a diagrammatic view of an auxiliary control system for operating the system of Fig. 4 in accordance with the chart, Fig. 5.

In Fig. 6 is shown a familiar type of auxiliary control system for operating the main system of Fig. 4, in accordance with the sequence chart of Fig. 5. A master controller MC, when successively operated through positions $a$ to $g$, inclusive, in one direction from its "off" position, is adapted to accelerate the motor, and when successively operated through positions $a'$ to $g'$, inclusive, in the other direction, is adapted to effect regenerative operation of the motor.

The motor is accelerated by first successively closing the switches R1, R2 and R3, thereby reducing the main-circuit resistance. The switches G2 and G1, which govern the resistor in the shunt field circuit of the generator G, are then successively opened, thereby decreasing the excitation of the series field winding F, and causing a further increase in main motor speed. The final running position comprises the short-circuiting of the series field winding 3, by the closure of the switch 7, thus producing an increased field flux in the motor M, by reason of the differential action of the field windings 1 and 3. The motor-generator set thus decreases in speed, and the current in the series-field winding F is correspondingly decreased, thereby effecting a further increase in speed of the main motor. The series field winding F is so designed and proportioned that, under relatively light-load conditions, that is, when a relatively weak field current obtains, only a portion of the armature current is required to energize the field winding F, the other portion traversing the armature winding of the generator G, thus serving to drive the motor-generator set. In this case, the armature of the motor M generates current and charges the battery. When the main field winding F is operating near its maximum excitation, it requires more current than that corresponding to the motor load. Under this condition, the extra field current is supplied by the armature of the generator G, acting as a generator, while the motor M is driven by the battery as a motor.

During regeneration, as shown in Fig. 6, switch M1 remains permanently open and a new switch 8 is closed in its place, thereby exciting the series field winding F entirely from the generator G. The operating connections are otherwise shown as similar to those utilized in acceleration. However, if desired, the main field winding F may be reversed and retained in series circuit relation with the armature A during regeneration. It will be noted that the system described permits the use of a battery of relatively small capacity, inasmuch as it is charged during a portion of the operation. It also may be chosen of a well suited voltage.

Figure 7:
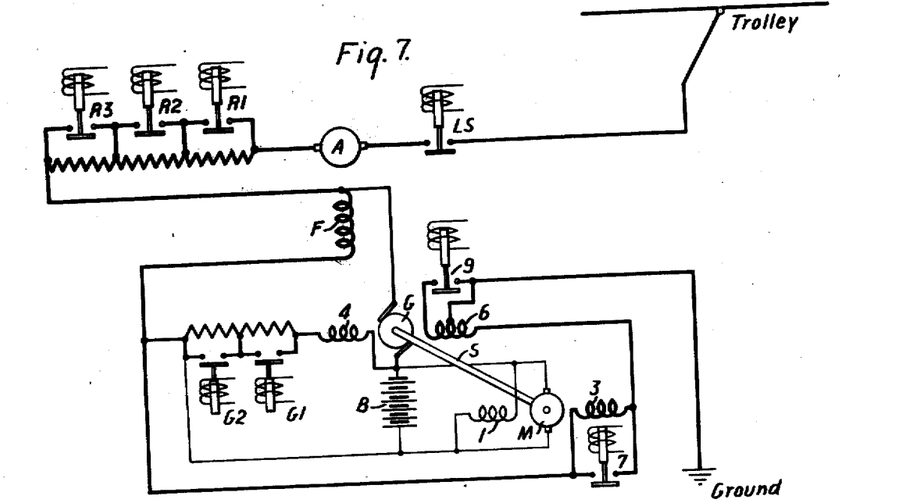
Figs. 7, 8 and 9 are views corresponding, respectively, to Figs. 4, 5 and 6, of modified systems of my invention.

Fig. 7 illustrates a system that is adapted for "field control" and regenerative control, and is dependent upon the differential action between a battery and a small exciter that is driven by a motor. The system comprises a suitable supply circuit; the armature A; series field winding F; a motor-generator set similar to that shown in Fig. 4; a main circuit resistor, the sections of which are adapted to be respectively short-circuited by switches R1, R2 and R3; line switch LS; the switch 7 for short-circuiting the series field winding 3; and a switch 9 for short-circuiting a portion of the series field winding 6.

Assuming that the motor-generator set operates at a substantially constant speed, the relative voltages of the battery and the motor-generator set may, for instance, be chosen in such manner that, when the shunt field winding 4 of the generator G is alone active, that is to say with no load on the main motor, the voltage of the generator armature is equal and opposite to the battery voltage, and, therefore, the main motor has zero field excitation. However, when the main motor is operative and is consuming current from the supply circuit, the generator series field winding 6 is designed to oppose or counteract the shunt field winding 4, thereby decreasing the generator voltage to a value that is less than the voltage of the battery, whereupon the battery will energize the main series field winding F, the energization varying directly with the main motor load.

If desirable, the shunt and series field windings of the small motor M may be differentially wound to cause an increased motor speed with increased main motor load, thus changing the operating characteristics of the main motor, as will be understood.

Figure 8:
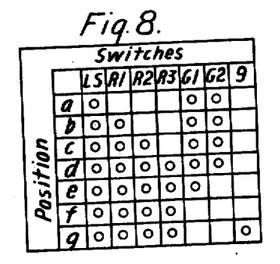
Figure 9:
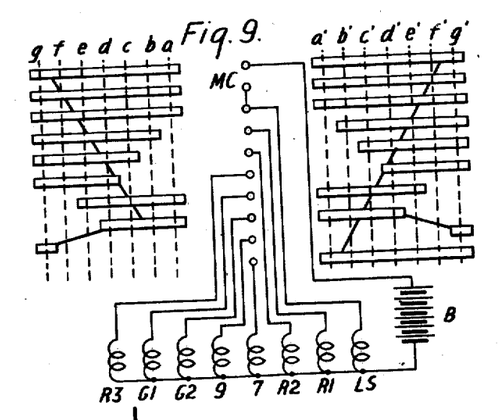

As indicated by the sequence chart of Fig. 8, and in the auxiliary control system of a familiar type that is illustrated in Fig. 9, the main motor is accelerated by initially short-circuiting the main circuit resistor, and subsequently weakening the field flux of the generator G, as set forth in connection with Fig. 4. The short-circuiting of a portion of the series field winding 6, by the closure of the switch 9, further weakens this field flux, to cause an additional increase in main motor speed.

During regeneration, the same motor-controlling steps may be made, the series field winding 3 of the small motor M being preferably permanently short-circuited by the closure of the switch 7, as indicated in Fig. 9.

Figure 10:
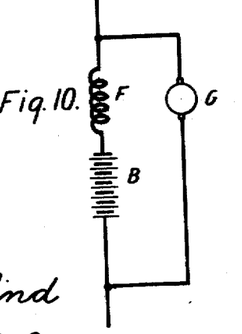
Figs. 10 and 11 are diagrammatic views of modifications of a portion of the system illustrated in Fig. 7.
Figure 11:
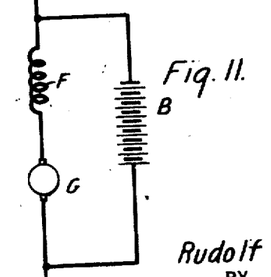

Figs. 10 and 11 show other suitable connections of the main series field winding F, the battery B, and the armature of the generator G. In Fig. 10, the armature is connected in parallel relation to the series-connected field winding and battery, while in Fig. 11, the battery is shunted across the series-connected field winding and armature.

As another modification of Fig. 7, the generator G may be employed, instead of the battery, to supply current for the main field winding F. In this case, the two field windings of the generator are both connected to magnetize in the same direction. Under no-load conditions of the main motor, the shunt field winding 4 of the generator is adapted to produce a generator voltage that is equal and opposite to the battery voltage, as in the previous case. During load conditions, however, the series field winding 6 supplies additional exciting flux; the voltage of the generator G thus overcomes the battery voltage and energizes the main field winding F.

Figure 12:
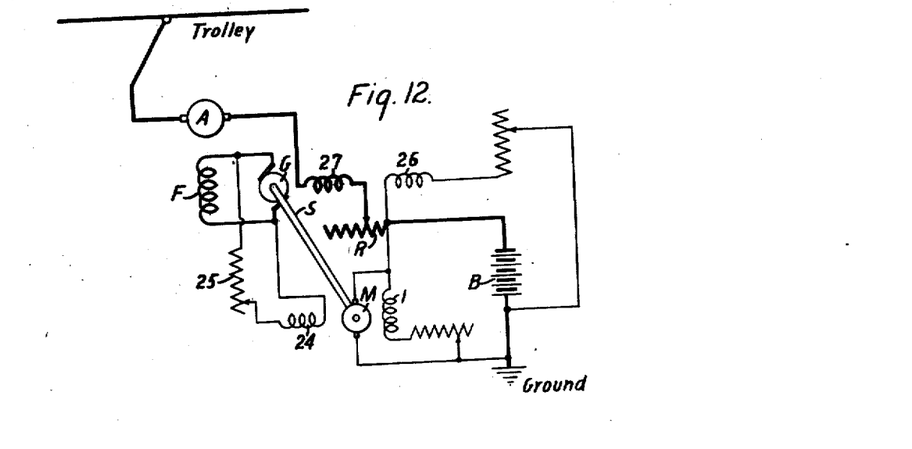
Fig. 12 is a diagrammatic view of a further modification of my invention.

Referring now to Fig. 12, the system shown comprises the supply-circuit conductors respectively marked "Trolley" and "Ground," the main motor armature A and field winding F, an auxiliary motor-generator set including a motor M and a generator G, a battery B, and a main circuit accelerating resistor R. The motor M is supplied with energy from the battery B and is provided with a variable shunt field winding 1, and a second field winding 24 that is connected in series circuit with a variable resistor 25 across the main field winding F. The generator G has its armature connected to excite the field winding F, and is provided with a variable field winding 26, which is connected across the battery B, and a second field winding 27 that is connected in series circuit with the main armature A.

The regenerative operation of the system may be briefly described as follows: Regulation of the regenerated current may be effected by suitable manipulation of the resistor R or the resistor 25, to vary the field current of the generator G or of the motor M, respectively, or by variation of the current in the field winding 1 or the field winding 26, as will be understood. For a given direction of rotation of the main motor, the excitation of the field winding 24 will remain constant in direction, by reason of its association with the main field winding F, and thus cannot have a negative compounding effect upon the small motor, to cause an undesirably high speed thereof.

The remaining systems are of a different type from those previously set forth, being, in general, more simple in arrangement by reason of the fact that either a motor-generator or a battery alone is used in connection with the main-field-winding excitation, whereas, in the preceding systems, both are utilized. Moreover, in the foregoing systems wherein the main-field-winding excitation is entirely independent of the trolley voltage, the unavoidable fluctuations of trolley voltage may, at times, produce undesirable effects, particularly in the case of a sudden interruption of supply-circuit voltage, when relatively heavy currents may occur for an instant.

On the other hand, in systems of the class wherein the main field-winding-excitation voltage is dependent upon the supply-circuit voltage, so that such excitation varies with the supply-circuit voltage and thus, the above-mentioned excessive currents cannot occur, the system is inherently adapted to produce undesirably high regenerated voltage upon a sudden decrease or interruption of supply circuit voltage, since the inherent tendency, in many systems, is to maintain a main-field-winding excitation that is sufficient to provide a main armature or regenerated voltage that is higher than the normal supply-circuit voltage by a predetermined amount. Particularly, in systems that employ a motor-generator set or the like that is driven from the regenerated voltage, the cycle of operation is such as to successively increase the regenerated voltage that is supplied to the motor-generator set and thus increase the main-field-winding excitation and, therefore, the main-armature or regenerated voltage. Under such conditions, a dangerously high regenerated voltage is liable to be attained in the course of a second or so, thereby leading to "flash-over" troubles and the like in the main motors or in the driving motor of the auxiliary motor-generator set.

A compromise system which embodies the good features of both of the above-mentioned classes of systems may be obtained by making the main-field-winding excitation normally substantially independent of the supply-circuit voltage, and by preventing excessive regenerated currents, either by making such excitation dependent upon the regenerated current in a suitable manner or by making such excitation only temporarily dependent upon the supply-circuit voltage, until relays or other control devices have been given time to operate and either interrupt the circuit connections or change them to correspond to the new values of supply-circuit voltage. Certain of the previously-described systems embody this compromise feature, as do also the following systems, which, as previously mentioned, are in some ways simpler than the systems that were first set forth.

Figure 13:
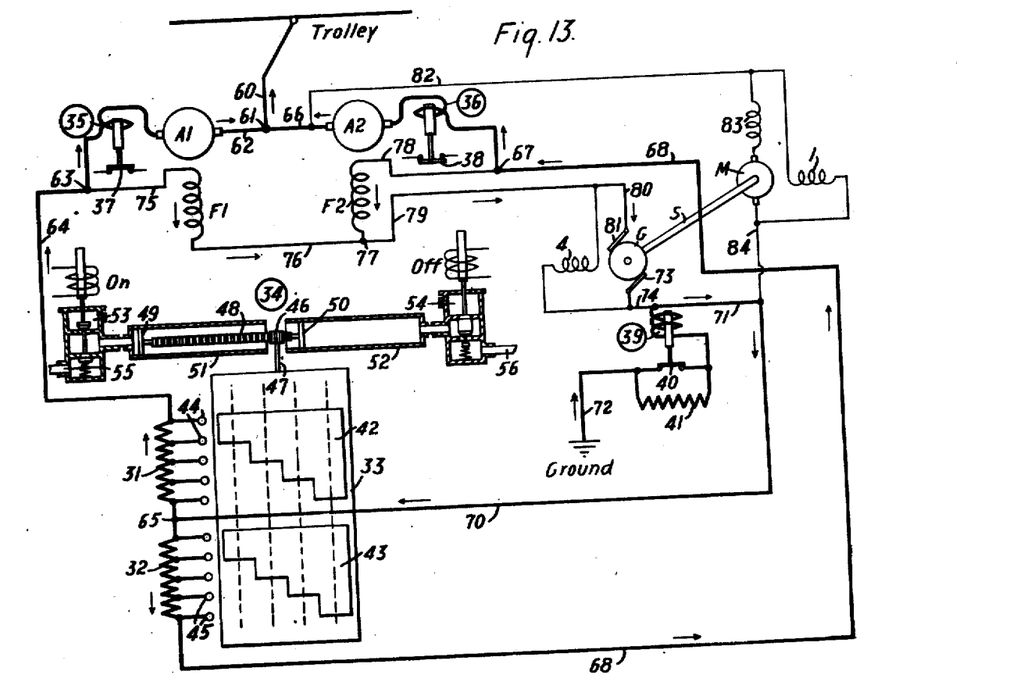
Fig. 13 and Fig. 15 are diagrammatic views of the main circuits and a portion of the auxiliary governing circuits, respectively, of another type of modified system.
Figure 14:
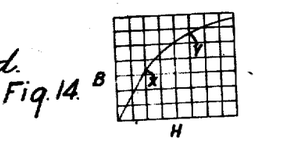
Fig. 14 is a curve chart serving to illustrate certain operating characteristics of one of the auxiliary machines that is shown in Fig. 13 and Figs. 16 to 24, inclusive, are diagrammatic views of further modifications of my invention that correspond in type to Fig. 13.

Referring to Fig. 13, the system shown comprises the supply-circuit conductors Trolley and Ground; a plurality of main dynamo-electric machines respectively having armatures A1 and A2 and field windings F1 and F2 of the series type; the auxiliary motor-generator set having armatures M and G; a plurality of main-circuit resistors 31 and 32 that are associated with the respective main armatures in a manner to be described and are adapted to be suitably governed by a controller 33 that is operated by an actuating mechanism 34; a plurality of main-armature-current-energized relay devices 35 and 36, which are respectively provided with auxiliary coöperating stationary and movable contact members 37 and 38 for purposes to be described in connection with Fig. 14, and a third relay device 39 that is energized by the regenerated current of one of the main armatures and is provided with coöperating stationary and movable contact members 40 for normally short-circuiting a resistor 41, as set forth in detail later.

The controller 33 is preferably of the familiar drum type, embodying a plurality of movable contact segments 42 and 43, of a suitable configuration for successively engaging a plurality of sets of control fingers 44 and 45 to gradually vary the active circuit value of the main-circuit resistors 31 and 32, respectively.

The operating mechanism 34 is of a familiar electrically-controlled, pneumatically-actuated type and comprises a pinion 46 which is rigidly secured to one end of the operating shaft 47 for the controller 33 and is adapted to mesh with a horizontally-movable rack member 48, to the opposite ends of which pistons 49 and 50 are secured to respectively operate within suitable cylinders 51 and 52. A pair of dissimilar valves 53 and 54 are associated with the cylinders 51 and 52, respectively, to admit fluid-pressure thereto from any suitable source (not shown) through pipes or passages 55 and 56, respectively, under conditions to be described.

The mechanical operation of the mechanism just described, without regard to the electrical connections effected thereby, may be set forth as follows; the valve member 54 is normally open to admit fluid-pressure from the pipe 56 to the cylinder 52, whereas the valve member 53 is normally closed to prevent the access of fluid pressure to the cylinder 51 and to connect that cylinder with the atmosphere. Consequently, the pistons 49 and 50 and the controller 33 are normally biased to the illustrated position. Upon the energization of actuating coils "On" and "Off," with which the valve members 53 and 54 are respectively provided, the normal unbalanced fluid-pressure conditions in the cylinders 51 and 52 are reversed, that is to say, fluid pressure is admitted through the opened valve 53 to the cylinder 51 and is exhausted from the cylinder 52 through the closed valve 54, whereby the pistons 49 and 50 move toward the right from the illustrated position, and the controller 33 moves into the position of initial engagement of the corresponding control fingers and contact segments.

To arrest the movement of the operating mechanism and the controller in any desired position, it is merely necessary to deënergize the "off" actuating coil, whereby balanced fluid-pressure conditions immediately obtain in the operating cylinders 51 and 52, and a positive and reliable stoppage of the mechanism is secured. To effect the return of the mechanism and controller to the illustrated position, the actuating coils "On" and "Off" are simultaneously deënergized, whereby unbalanced fluid-pressure conditions in the mechanism revert to the original state, and, consequently, the device is actuated toward the position shown.

Assuming that regenerative operation has been begun in any suitable manner, the various circuit connections may be traced as follows: The main circuit is established from the trolley through conductor 60, junction-point 61, where the circuit divides, one branch including conductor 62, main armature A1, the actuating coil of the relay device 35, junction-point 63, conductor 64, and main-circuit resistor 31 to another junction-point 65, and the other branch including conductor 66, main armature A2, the actuating coil of the relay device 36, junction-point 67, conductor 68, and main-circuit resistor 32 to the junction-point 65 whence a common circuit is completed through conductors 70 and 71, the actuating coil of the relay device 39, the normally short-circuited resistor 41, and conductor 72 to the negative supply-circuit conductor Ground.

The main field-winding-excitation circuit is established from the positive terminal 73 of the auxiliary generating armature winding G, through conductors 74, 71 and 70 to the junction-point 65, where the circuit divides, one branch including the main-circuit resistor 31, conductor 64, junction-point 63, conductor 75, main field winding F1 and conductor 76 to junction-point 77, and the other branch including main-circuit resistor 32, conductor 68, junction-point 67, conductor 78 and main field winding F2 to the junction-point 67, whence a common circuit is continued through conductors 79 and 80 to the negative terminal 81 of the auxiliary generating armature winding G.

An auxiliary circuit is completed from the positively-energized conductor 66 through conductor 82, series-related or compensating field winding 83 for the auxiliary driving-motor-armature winding M, and conductors 84 and 70 to the negative conductor, Ground.

The auxiliary motor-generator set, in the system just described, is especially designed to provide the desired operating characteristics of a substantially constant generated voltage under varying supply-circuit conditions. The auxiliary motor armature M is provided with the shunt-excited field winding 1 and the compensating field winding 83, the magnetic circuits (not shown) for which are so designed and proportioned that they are not normally saturated and, consequently, with varying supply-circuit voltage, the magnetic conditions in the auxiliary motor inherently and immediately vary correspondingly to maintain a substantially constant motor speed.

The above-mentioned unsaturated conditions of the field-winding magnetic circuit of the auxiliary motor is graphically illustrated in Fig. 14, the curve of which represents the familiar B—H or magnetization curve of the field-winding magnetic circuit. As is well-known, main dynamo-electric machines and, in particular, auxiliary driving motors, of the class in question normally have their field-winding magnetic circuits relatively highly saturated; that is to say, the machines operate with a normal degree of saturation that corresponds to the point Y in the curve which is located above the bend or knee thereof. In the present instance, however, the auxiliary driving motor is adapted to operate with a degree of field-winding magnetic circuit saturation that is relatively low and corresponds to the point X of the curve, which is located upon the straight-line portion thereof below the bend or knee. Thus, the auxiliary driving motor inherently possesses relatively great stability and is economical in operation, as will be appreciated by those skilled in the art.

On the contrary, the magnetic circuit for the field winding of the auxiliary generating armature G is preferably saturated to a relatively high degree, so that, with the practically constant-speed conditions under which the motor-generator set operates, the exciter voltage is maintained substantially constant.

The main circuits just recited form no material part of my present invention except as they constitute a preferred type of regenerative system to which my present invention is applicable, and are fully set forth and claimed in my co-pending application, Serial No. 44,443, filed August 9, 1915, patented April 1, 1919, No. 1,298,706. However, a brief description of the main-circuit operation will be of interest in the present case.

As indicated by the arrows, the main-armature or regenerated current and the main-field-winding or excitation current traverse the main-circuit resistor 31, for example, in the same direction. Consequently, upon an incipient increase of regenerated current, the voltage drop across the resistor 31 is immediately and inherently increased to a corresponding degree, whereby the voltage available for delivery to the allied main field winding F1 from the auxiliary generating armature G is accordingly reduced, to decrease the current flow through the main field winding F1 and thus effect a reduction of the main-armature current to the desired normal value. The converse action automatically takes place in the case of an incipient decrease of regenerated current in either main armature, as will be understood. Consequently, what may be termed a "negative compounding effect" is automatically and inherently provided in the system, and a relatively stable regenerative control system is thus obtained.

As an additional means for maintaining the regenerated current substantially constant, the relay device 39 and the resistor 41 may be employed, if desired. The relay device 39 has a relatively high setting, that is, it is adapted to be actuated from the illustrated position, wherein the resister 41 is short-circuited, whenever the combined regenerated currents of the armature A1 and A2 reach a predetermined relatively high value. Thus, the resistor 41 is automatically connected in circuit under such high-current conditions to reduce the regenerated current to the desired normal value, whereupon the relay device 39 again drops to its lower position to short-circuit the resistor 41.

The relay device connections just described form no part of my present invention, and are fully set forth and claimed in a co-pending application of N. W. Storer, Serial No. 829,439, filed April 4, 1914, patented Nov. 6, 1917, No. 1,245,396, and assigned to the Westinghouse Electric and Manufacturing Company.

Figure 15:
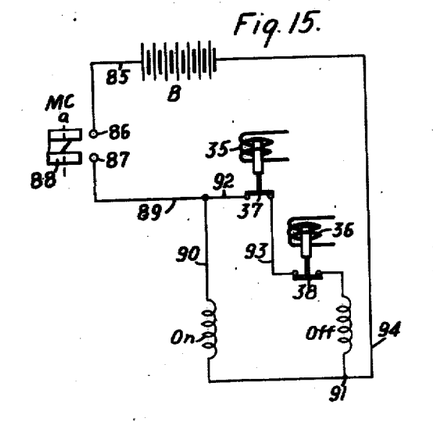

The auxiliary governing system that is shown in Fig. 15 comprises the actuating coils "On" and "Off" for the operating mechanism 34 of Fig. 13; the auxiliary contact members 37 and 38 of the relay devices 35 and 36 respectively; a suitable source of energy, such as a battery B; and a portion of a master controller MC which is shown as adapted to occupy an "off" position and an operative position $a$.

Under the assumed conditions, wherein the relay device 35, which corresponds to the familiar "limit switch," is not sufficiently energized to rise to its upper or open position, while the other relay device 36, which corresponds to a "low-current relay" is sufficiently energized to remain in its upper or closed position, the auxiliary circuit shown may be traced as follows: from the positive terminal of the battery B through conductor 85, control fingers 86 and 87, which are bridged by contact segment 88 of the master controller, in its operative position $a$, and conductor 89, where the circuit divides, one branch including conductor 90 and the actuating coil "On" to a junction-point 91, and the other branch including conductor 92, the coöperating contact members 37 of the limit switch 35 in its lower position, conductor 93, the coöperating contact members 38 of the low-current relay device 36 in its upper position and the actuating coil "Off" to the junction-point 91, whence a common circuit is completed through conductor 94 to the negative battery terminal.

Since the actuating coils "On" and "Off" are simultaneously energized under the conditions described, the controller 33 will be moved forwardly a step to exclude predetermined portions of the main-circuit resistors 31 and 32 from the main-field-winding circuits and thus compensate for the initial gradual decrease of vehicle speed during the regenerative period. Thereupon, the limit switch 35 will be raised to its upper position to deënergize the "off" actuating coil and thus effect the stoppage of the controller 33 in the position occupied, in accordance with the previously-described operating principles of the mechanism 34.

Furthermore, if the supply-circuit voltage is suddenly interrupted by reason of the trolley leaving the wire, for example, then the instantaneous temporary reduction of regenerated current will permit the low-current relay device 36 to drop to its lower position and thus open the energizing circuit of the "off" actuating coil. In this case also, therefore, the controller 33 will be held in the position that was occupied at the time of the supply-circuit voltage interruption.

If the interruption in question is of relatively short-duration, the machine circuits need not be opened and, when the supply-circuit voltage is resumed, the regenerative braking operation is continued under the control of the limit switch 35. Although there is inherently a certain rise of regenerated voltage when the supply-circuit connection is interrupted, such rise will be definitely limited in the system just described. On the other hand, if the supply-circuit interruption continues for more than a few seconds, the system should be entirely disconnected from the trolley, and such disconnection may be effected by means of a time-limit relay device or the like, as set forth in my co-pending application, Serial No. 122,373, filed September 27, 1916.

It will be understood that, instead of using a low-current relay device 36, an over-voltage relay that operates upon a certain increase of regenerated voltage over the normal, may be utilized.

Figure 16:
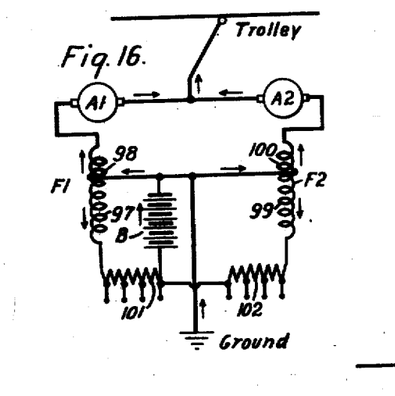

The system shown in Fig. 16 comprises the supply-circuit conductors Trolley and Ground; the main dynamo-electric machines comprising the armatures A1 and A2 and the field windings F1 and F2; and, in addition, a battery B for exciting certain portions of the field windings; and a plurality of variable resistors 101 and 102 that are connected in circuit with the respective battery-excited portions of the field windings.

In the present system, the field winding F1 is divided into a larger portion 97 and a smaller continuous portion 98, while the other main field winding F2 is divided into a pair of corresponding sections 99 and 100. The portion 97 of the field winding F1 is connected in circuit with the battery B through the variable resistor 101, and a similar connection of the field winding sections 99 and the variable resistor 102 obtains.

As indicated by the respective arrows, the main armature or regenerated current traverses the smaller field-winding sections 98 and 100 in the same direction as it traverses the main armatures A1 and A2, whereas the auxiliary current that is supplied by the battery B flows through the larger field-winding portions 97 and 99 differentially with respect to the main current in the smaller field-winding sections 98 and 100.

Thus, the desired negative compounding effect is obtained in the system under consideration for the following reasons: The normal excitation that is supplied by the main field winding F1, for example, is the resultant flux that is produced by the differentially-related sections 97 and 98. In case of an incipient increase of main-armature or regenerated current, the effect of the smaller field-winding sections 98 will be increased to correspondingly reduce the total effective field-winding flux, and thus, the regenerated current is inherently reduced to the desired normal value. The converse action, of course, takes place in case of an incipient decrease of regenerated current.

To compensate for the gradual decrease of vehicle speed during the regenerative period, the field-winding-circuit resistors 101 and 102 may be gradually excluded from circuit in any suitable manner to thereby correspondingly increase the effective main-field-winding excitation.

Figure 17:
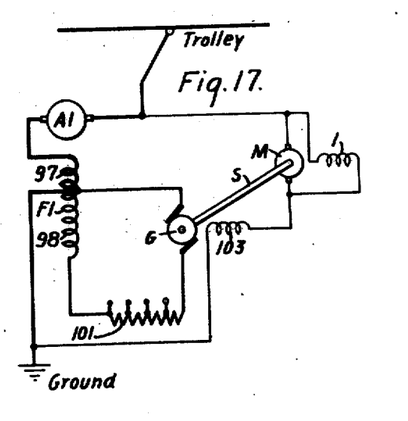

Fig. 17 discloses a system, the main-circuit connections for which are similar to those shown in Fig. 16, with the exception that an auxiliary generating armature G is substituted for the battery B to energize the field-winding section 98 through the variable resistor 101. Furthermore, the driving armature winding M for the generating armature G is connected in series relation with a field-magnet winding 103 for the generating armature, across the supply-circuit, and the shunt-connected field winding 1 is provided for the driving armature M.

The purpose of such location of the auxiliary field winding 103 is to hasten the desired counteracting variations of the main-field-winding excitation by making it temporarily dependent upon changes of the supply-circuit voltage. In general, the design of parts of the motor-generator set corresponds to that set forth in connection with Fig. 13 and the curve of Fig. 14. In addition, in case of an increase or upward fluctuation of the supply-circuit voltage, the current traversing the circuit that includes the auxiliary driving armature winding M and the field winding 103 for the generator armature G is correspondingly increased to thus augment the delivered voltage of the armature G and finally, therefore, to increase the effective flux that is produced by the total field winding F1. In this way, the regenerated voltage of the main armature A1 is raised a predetermined amount in a relatively short space of time to thus tend to maintain a substantially constant difference between the main-armature voltage and the supply-circuit voltage, whereby a practically constant regenerated current is supplied. The converse action occurs upon a decrease of supply-circuit voltage, as will be understood. Furthermore, the negative compounding effect that was described in connection with Fig. 16 is also inherently possessed by the system just described.

Figure 18:
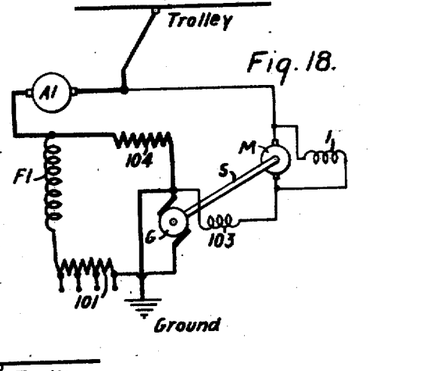

Referring to Fig. 18, the auxiliary motor-generator set is constructed and arranged similarly to that set forth in connection with Fig. 17, but the grounded terminal of the generating armature winding G is connected through a resistor 104, of preferably fixed value, to the upper terminal of the main field winding F1. Consequently, the desired negative compounding effect is obtained in the manner set forth in connection with Fig. 13 whereas, in addition, the hastening action of the auxiliary field winding 103 in the case of supply-circuit-voltage fluctuations is obtained. To compensate for the decrease of vehicle speed, the resistor 101, or, if desired, the resistor 104, may be gradually excluded from circuit, as previously described.

Figure 19:
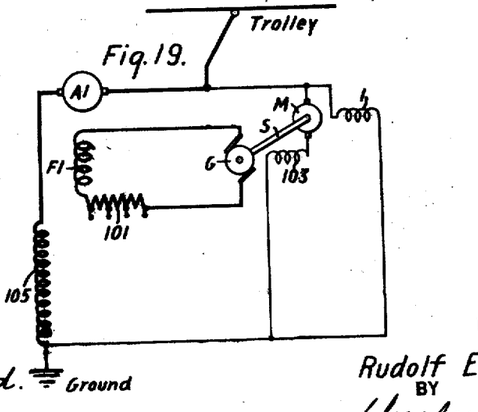

In Fig. 19, the main field winding F1 is connected through the variable resistor 101 across the auxiliary generating armature winding G, being entirely disconnected from the main-armature circuit, which includes an inductive device 105 in series relation with the main armature A1.

The auxiliary motor-armature winding M is provided with a field winding 1 which is connected across the supply circuit, while the generating armature G is again provided with the field winding 103 that is connected in series relation with the auxiliary motor armature M.

With a design of the motor generator set that corresponds to that set forth in connection with Fig. 13 and the curve of Fig. 14, the main-field-winding excitation is thus essentially independent of the supply-circuit voltage as well as of the regenerated current, but is temporarily dependent upon fluctuations of supply-circuit voltage by reason of the utilization of the field winding 103 for the auxiliary generator armature.

The result of such an arrangement is to provide the regenerating machine with a relatively flat speed-torque characteristic curve, that is to say, a slight change of vehicle speed will produce a considerably greater variation of torque, which condition is sometimes desired, and yet, sudden overloads or surges of current will be prevented, and relay devices or the like will have sufficient time to operate under emergency conditions, such as the interruption of supply-circuit voltage.

The purpose of the inductive device 105 is to act as a further preventive of sudden and material changes of regenerated current by reason of its well-known choke-coil effect, although, in many cases, the use of such an inductive device will not be necessary to the satisfactory operation of the system.

Figure 20:
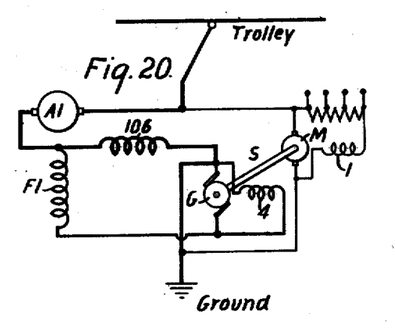

Fig. 20 discloses a system comprising the main dynamo-electric machine and the auxiliary motor-generator-set armatures as previously described, but an inductive device 106 is substituted for the resistor 104 of Fig. 18, for example, to thereby produce substantially the same negative compounding effect temporarily, by reason of the well-known inductive "kick" that occurs upon sudden changes of current conditions. The auxiliary armatures M and G are respectively provided with the shunt field windings 1 and 4.

By designing the motor-generator set so that the auxiliary motor has a relatively unsaturated field-magnetic circuit, while the auxiliary generator has a relatively highly saturated field-magnetic circuit, as previously described in connection with the curve of Fig. 14, a substantially constant voltage is delivered by the generator armature G under conditions of supply-circuit voltage variation, but the main-field-winding excitation is temporarily influenced by changes in the regenerated current that traverses the inductive device 106, as already explained.

Figure 21:
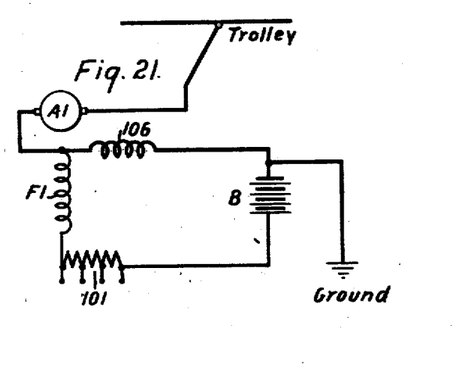

In Fig. 21, a similar result is obtained by substituting the constant-voltage battery B for the auxiliary motor-generator set that is shown in Fig. 20, as will be understood. The variable field-winding-circuit resistor 101 may be utilized, if desired, in both of the systems that are illustrated in Fig. 20 and in Fig. 21 for the above-mentioned purpose of compensating for the decrease of vehicle speed.

Figure 22:
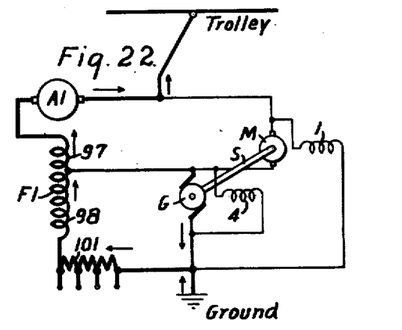
Figure 23:
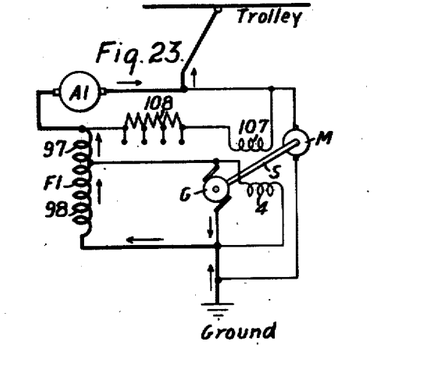

Fig. 22 and Fig. 23 correspond, in general, to Fig. 17, in that a plural-section main-field winding $F^1$ is employed. However, the connection to Ground is made intermediate the variable resistor 101 and the positive terminal of the generating armature G, which, in this case, is connected to send current through the field-winding section 98 oppositely to the direction taken in the system of Fig. 17, that is to say, in the same direction as the main armature or regenerated current, which, in the present system, traverses the variable resistor 101 and both field-winding sections 98 and 97 in the same direction.

Thus, the generating armature winding G is required to supply an exciting current that equals the difference between the necessary excitation current for the field-winding section 98 and the main armature or regenerated current, whereby the motor-generator set may be of smaller capacity than those hereinbefore described.

However, to provide the negative compounding effect that was described in connection with Fig. 17 by reason of the differential arrangement of the currents traversing the field-winding sections 97 and 98, it is necessary, in the present system, to reverse or oppositely wind the field-winding section 97 so that, although the current traverses the two field-winding sections in the same direction, the action thereof is differential, and thus, the desired negative compounding effect is inherently obtained.

In this case also, the auxiliary motor-generator set is specially designed, as previously described in connection with the curve of Fig. 14, to maintain a generated voltage that is essentially independent of the supply-circuit voltage.

In Fig. 23 the field winding 1 for the auxiliary driving motor is omitted and, as a substitute therefor, a field winding 107 is connected through a variable resistor 108 across the main armature A1. Otherwise the circuit connections and operation are substantially the same as just set forth in connection with Fig. 22, and no further exposition thereof is believed to be necessary.

Figure 24:
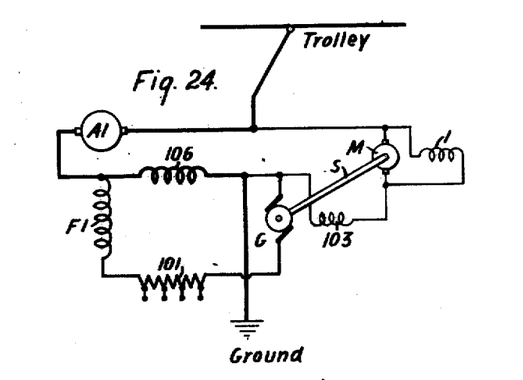

Fig. 24 shows a system in which certain desirable operating features of the systems that are shown in Fig. 17 and in Fig. 20 are combined; that is to say, the auxiliary field winding 103 for the generator armature G is utilized to provide the previously-explained hastening action upon the main-field-winding excitation changes in the case of supply-circuit-voltage fluctuations and, in addition, the inductive device 106 is connected in the common portion of the main-armature and main-field-winding circuits to inherently produce the desired temporary negative compounding effect, as previously explained. The motor-generator set is of the special type hereinbefore set forth in connection with the curve of Fig. 14; that is, the auxiliary motor has a relatively unsaturated field-magnetic circuit, whereas, the corresponding circuit of the auxiliary generator is relatively highly saturated. To compensate for the decrease of vehicle speed, the variable field-winding-circuit resistor 101 may be gradually excluded from circuit, or other previously described methods may be employed.

I desire it to be understood that the expression "constant excitation" and the like which I have employed throughout the foregoing specification, signifies that the excitation in question is substantially constant for any given set of circuit connections, but, in all cases, the excitation will, of course, be varied in some manner by excluding portions of resistors from circuit or by otherwise modifying the circuit connections.

I do not wish to be restricted to the specific circuit connections or arrangement of parts, herein set forth, as various modifications thereof may be effected without departing from the spirit and scope of my invention. I desire, therefore, that only such limitations shall be imposed as are indicated in the appended claims.

I claim as my invention:

1. In a system of regenerative control, the combination with a supply circuit and a main dynamo-electric machine having an armature and a field winding, of an auxiliary motor-generator driven from the supply-circuit and connected to excite said field wind ing, the magnetic circuit of the auxiliary motor being relatively unsaturated and the magnetic circuit of the auxiliary generator being relatively highly saturated.

2. In a system of regenerative control, the combination with a supply circuit and a main dynamo-electric machine having an armature and a field-winding, of an auxiliary motor-generator driven from the supply circuit and connected to excite said field winding, the auxiliary motor having a supply-circuit-excited field winding and a relatively unsaturated magnetic circuit, and the auxiliary generator having a self-excited field winding and a relatively highly saturated magnetic circuit.

3. In a system of regenerative control, the combination with a supply circuit and a main dynamo-electric machine having an armature and a field winding, of a resistor connected in series-circuit relation with the main armature, and an auxiliary motor-generator having one of its armatures driven from the supply-circuit and the other connected to excite said field winding through said resistor, the magnetic circuit of the auxiliary driving armature being relatively unsaturated and the magnetic circuit of the auxiliary exciting armature being relatively highly saturated.

In testimony whereof, I have hereunto subscribed my name this 16th day of Oct., 1916.

RUDOLF E. HELLMUND.